March 1, 1960 M. A. JUTEN 2,926,816
METHOD AND APPARATUS FOR DISPENSING FLUID MATERIALS
Filed June 30, 1953 2 Sheets-Sheet 1
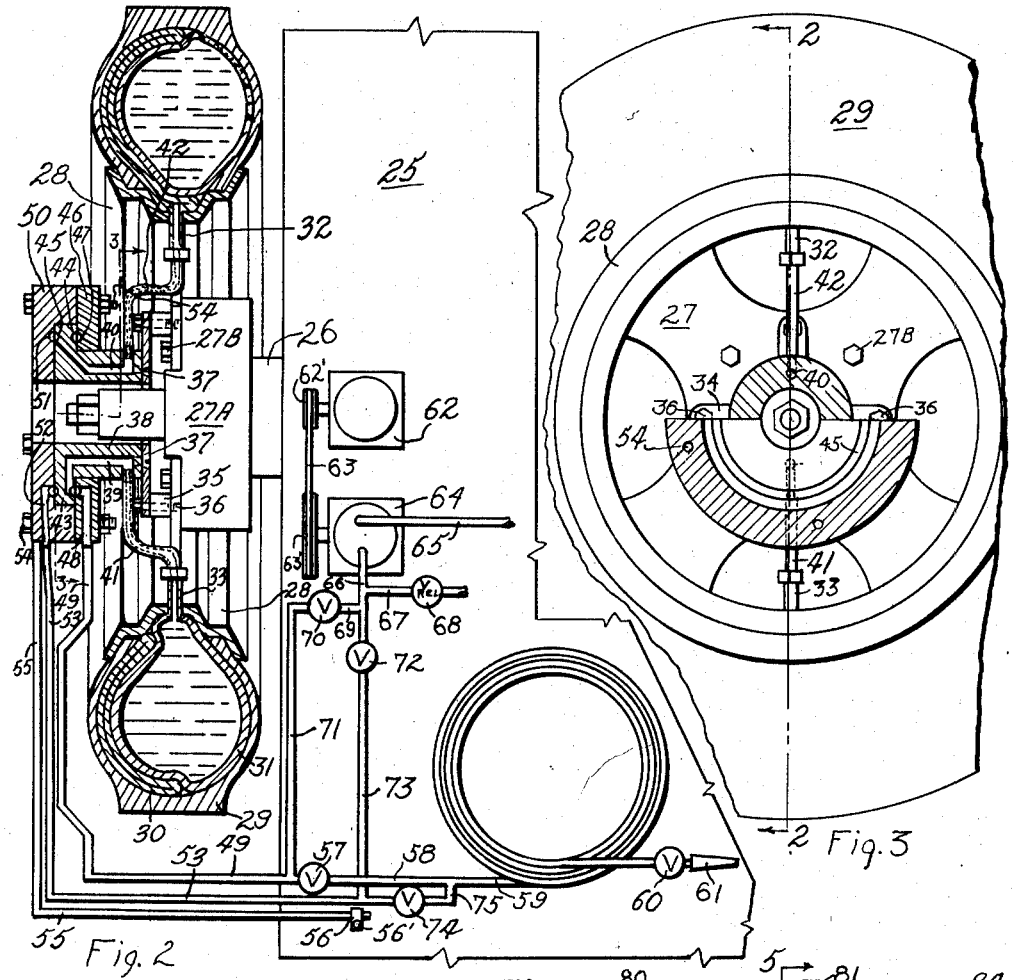
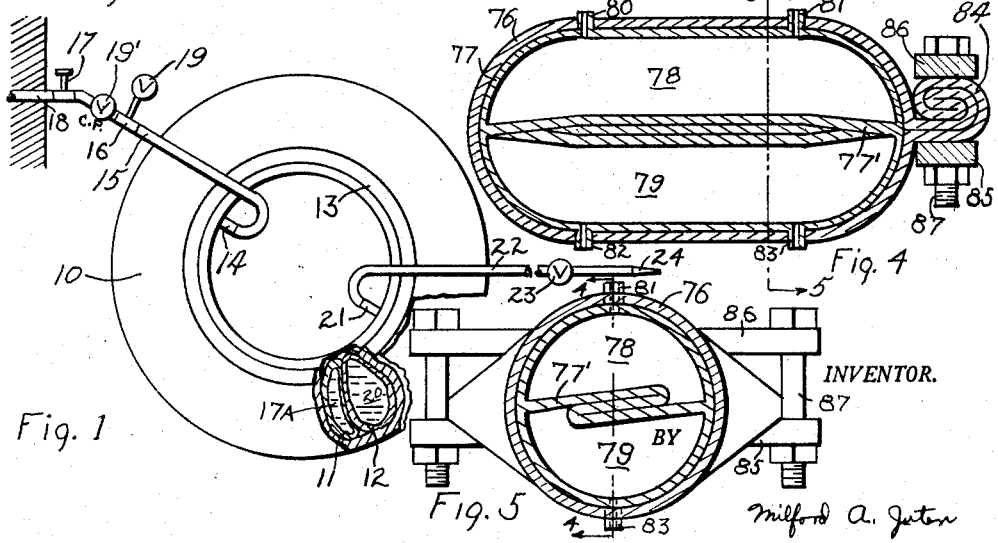
INVENTOR.
Milford A. Juten March 1, 1960 M. A. JUTEN 2,926,816
METHOD AND APPARATUS FOR DISPENSING FLUID MATERIALS
Filed June 30, 1953 2 Sheets-Sheet 2
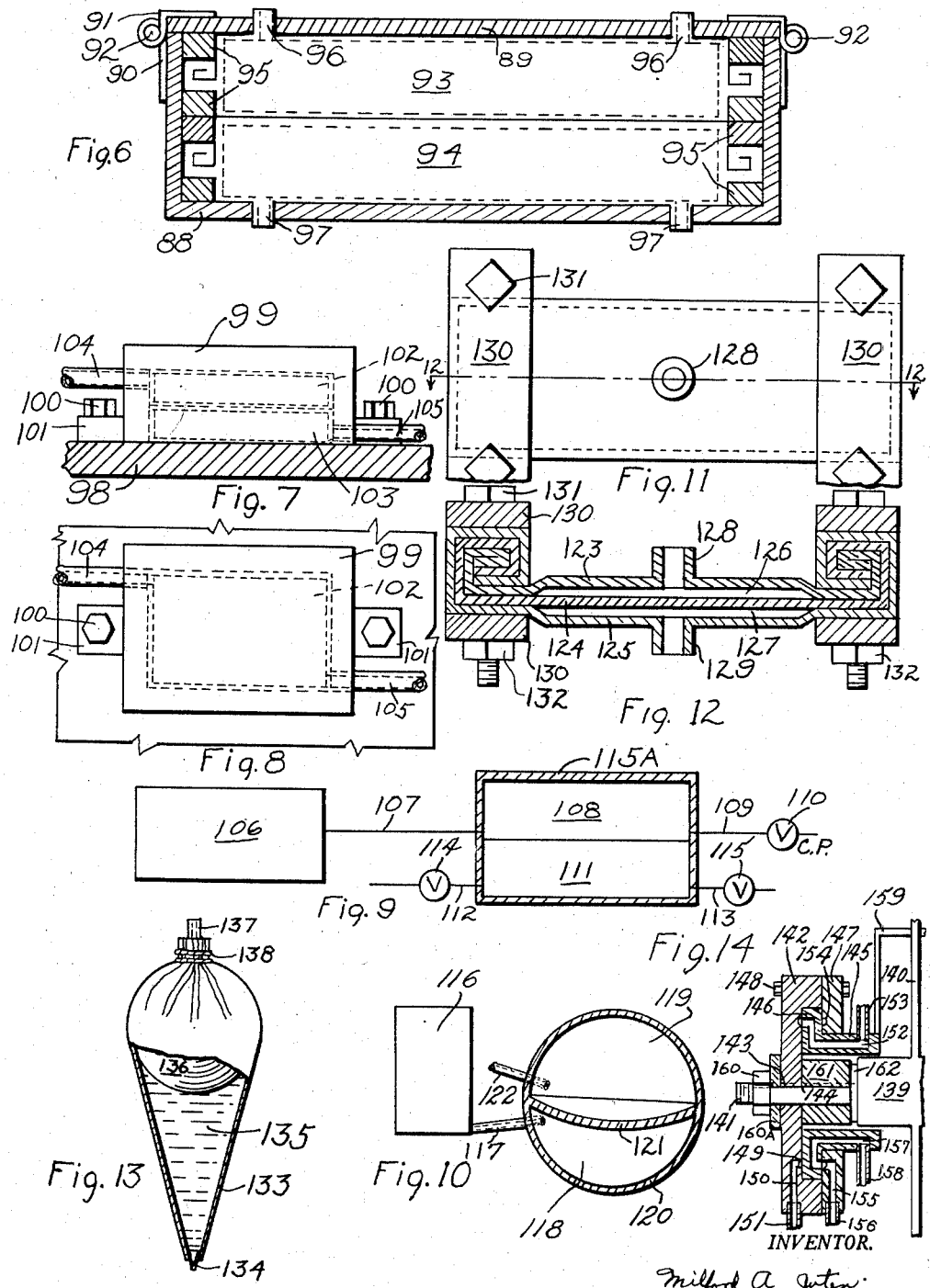
INVENTOR.
BY Milford A. Juten

United States Patent Office 2,926,816
Patented Mar. 1, 1960

2,926,816

METHOD AND APPARATUS FOR DISPENSING FLUID MATERIALS

Milford A. Juten, Brookmont, Md.

Application June 30, 1953, Serial No. 365,013

12 Claims. (Cl. 222—1)

The present invention relates to apparatus and method for packaging, transporting, storing and dispensing fluid material and more particularly to flexible containers for that purpose.

Heretofore liquids have been dispensed by providing air under pressure directly in contact with the liquid and in some cases the entrapped air in the liquid has been objectionable. This direct contact of air with the liquid has made it dangerous to use air under pressure in direct contact with inflammable liquids since there would be danger of explosion. There has been some effort to overcome this problem by the use of a rigid container with a flexible wall between two chambers in such rigid container, but it has required complicated and relatively inaccessible structural details to provide an operative device with the prior art constructions.

An object of the invention is to overcome the defects of the prior devices and to provide a simple efficient means and method for storing and dispensing fluids under pressure without direct contact of one pressure fluid with another.

Another object of the present invention is to provide a method and apparatus for dispensing fluid material by the application of a second fluid under pressure to the dispensed fluid without actual contact of the second fluid with such dispensed fluid.

A further object is to provide a container for fluid material which may occupy a minimum of space in unfilled condition and which may be readily filled with fluid material and such fluid material may be dispensed by means of a source of fluid pressure.

Another object is the provision of a container means which may be used for transporting fluid material or material which may be made fluid and which container includes means associated therewith for dispensing the fluid material therefrom at a controlled rate.

A further object of the present invention is the provision of means within a tire of a vehicle for containing fluid with means within the tire for dispensing the contained fluid while the vehicle is either in motion or stationary.

Another object is to provide means for carrying a gas or liquid in military vehicle tires whereby the enemy will not be aware of the same, and friendly forces will have an additional source of gas or liquid such as poisonous gas, liquid fuel for flame throwers, fluid for fire extinguishers, motor fuel and the like.

Another object is to provide a method and means for transferring a pressure from one fluid to another without physical contact of the two fluids.

Briefly the invention comprises the use of two fluid tight bladders in a casing or cage capable of withstanding a bursting pressure when pressure is applied to one or both bladders. The first bladder may be filled with a liquid or fluid to be dispensed and the second bladder may have a source of fluid pressure applied thereto which applied fluid pressure reacts on the second bladder and consequently against the first bladder whereby the contents of the first bladder is subjected to the same pressure as the pressure on the second bladder and the contents of the first bladder may be dispensed. In a form of the invention the casing may be made fluid tight and a single bladder may be used in such fluid tight casing with similar results, or a fluid tight partition may separate the bladder or fluid tight casing into two chambers.

Other and further objects will be apparent from the description and the drawings wherein:

Figure 1 is a schematic view of one form of the invention applied to a tire with a source of water pressure providing the power for dispensing a spray solution;

Figure 2, a partial plan view and with parts in section taken on line 2—2 of Fig. 3 of a portion of a vehicle including a tire on a wheel thereof and means for dispensing the fluid during motion of such vehicle;

Figure 3, a section taken on line 3—3 of Fig. 2 with parts omitted showing a portion of the vehicle tire with two fluid containing chambers and means providing communication between the tire chambers and fluid pressure applying and dispensing means operable while the vehicle is in motion;

Figure 4, a section on the line 4—4 of Fig. 5 of another form of the invention wherein the pressure fluid may pass continuously through its chamber;

Figure 5, a section on line 5—5 of Figure 4;

Figure 6, a section of another form of the invention in which the pressure resisting cage is a rigid box with one wall removable;

Figure 7, an elevation with parts in section of a form of the invention in which fluid pressure may be transferred from one liquid or fluid to another without mixing of the liquids;

Figure 8, a plan view with parts in section of the modification of Figure 7;

Figure 9, a diagrammatic view of a form of the invention in which a steam boiler is the source of fluid pressure;

Figure 10, a diagrammatic view with parts in section of a unitary flexible structure in which the walls of a partitioned bladder container are sufficiently strong for preventing bursting;

Figure 11, a plan view of another embodiment of the invention using a two celled open ended flexible element;

Figure 12, a section taken on line 12—12 of Figure 11;

Figure 13, an elevation with parts broken away of a pastry bag with a bladder therein for use in the confectionary trade; and Figure 14, a modification of a swivel similar to Figure 2 with parts omitted for clearness and parts broken away.

Referring more particularly to the drawings, one form of the invention is shown in Figure 1 in which a conventional tire casing 10 encases a first and second conventional inner tube 11 and 12 and such casing and inner tubes are maintained in operative relation by a conventional rim such as drop center rim 13 provided with an extra valve stem receiving opening for the second tube. Rim 13 serves to maintain the two inner tubes in the tire casing and prevents the inner tubes from bursting in the usual manner. As shown, inner tube 11 is collapsed on one side of the casing and its valve stem 14 is connected by means of a flexible hose 15 to a source of fluid pressure which may be a T-fitting 16 which is connected to a valve 17 by which fluid pressure may be controlled from a source of fluid pressure which may be a conventional city water supply pipe 18. An adjustable pressure relief valve 19 may be attached to the stem of the T-fitting and such pressure relief valve may be adjusted to prevent excessive pressure from being applied to the system. It will be apparent that a pressure reducing valve 19' may be used instead of the relief valve or in addition thereto for maintaining a constant pressure in the system.

The second inner tube 12 is filled with a liquid or fluid 20 to be dispensed and the valve stem 21 thereof is connected to dispensing hose 22 which is connected to a valve 23 which controls or stops the passage of liquid or fluid 20 to spray nozzle 24.

The operation is believed to be obvious from the above description. After the tire casing 10 containing the two inner tubes 11 and 12 is mounted on rim 13, the inner tube 12 is filled with a liquid or fluid such as an insecticide, paint or other fluid and dispensing tube or hose 22 with valve 23 and nozzle 24 is attached to valve stem 21. The conventional valve inside may have been previously removed from valve stem 21 or the connection between hose 22 and valve stem 21 may be of the type which automatically opens the valve (such as the well known expedient used in tire pumps) providing direct communication between the interior of the inner tube 12 and hose and nozzle.

The valve stem 14 of deflated inner tube 11 is connected to hose 15, to T-fitting 16 carrying relief valve 19 and to valve 17 of a conventional pressure water supply such as the city supply. It will be obvious that when valve 17 is opened to allow the water 17A under pressure to flow into inner tube 11 and carry the pressure to the inside of tube 11 and thence to the outside of inner tube 12 and therefore to liquid 20. Such liquid 20 will flow through valve stem 21, hose 22, valve 23, and nozzle 24 for use as directed by the operator. The valve 23 gives the operator complete control over the dispensing and spraying operation. The by-pass relief valve 19 and/or the pressure reducing valve 19' are adjusted for the desired pressure and prevent the application of excessive pressure to the system and consequently tire casing 10 will not be subject to rupturing pressures. It will be apparent that the pressure reduction valve 19' may be used alone to prevent the application of excessive pressure.

Referring to Figures 2 and 3 a form of the invention is illustrated in which the tire on a ground engaging wheel of a vehicle encases two inner tubes; the liquid or fluid in one of the inner tubes may be dispensed when the vehicle is in motion as well as when the vehicle is stationary.

A portion of a vehicle chassis 25 is mounted on an axle 26 upon which a conventional wheel 27 is rotatable. The wheel is mounted on the usual hub and brake drum 27A by bolts 27B and is provided with a tire receiving rim 28 which may be of the drop center type. A tire casing 29 with two inner tubes 30 and 31 is mounted on the rim 28. A second valve stem receiving opening is provided in the rim and valve stem 32 of inner tube 30 projects through one opening and valve stem 33 of inner tube 31 projects through the other opening.

For carrying the fluid pressure to inner tube 30 and for conveying the liquid to be dispensed from inner tube 31, a swivel connection including a stationary means and a rotatable means is provided so that the fluid may flow into inner tube 30 and the liquid may flow out from inner tube 31 while the vehicle is in motion and the wheel 27 is rotating or while the vehicle is stationary. A spider 34 is spaced from wheel 27 by means of tubular spacing elements 35. Bolts 36 passing through the extremities of the legs of spider 34 and through the spacing elements 35 are threaded into the wheel thereby securing the spider in operative position. Mounted on spider 34 by means of screw fastening elements 37 or the like is a circular flanged hollow manifold member 38 having passageways 39 and 40 which are in communication with inner tubes 31 and 30 respectively by means of conventional detachable tubular conduits 41 and 42 respectively extending from manifold member 38 to valve stems 33 and 32 respectively.

On opposite sides of a flange 43 of the manifold member 38 are grooves 44 and 45 in communication with passageways 39 and 40 respectively. A ring 46 provided with a groove 47 registering with groove 44 is rotatably mounted on the cylindrical portion of the hollow manifold member 38, said ring being provided with a passageway 48 in communication with groove 47 and with a conduit 49 for carrying the liquid being dispensed. A plate 50 having a circular recess therein receives and embraces the flange 43 of the manifold member 38 and is provided with a circular groove 51 in register with groove 45 and also has a passage 52 in communication with a conduit 53 for supplying pressure fluid to inner tube 30. Suitable means such as bolts 54 passing through plate 50 and ring 46 secure the said ring and plate together in fluid tight rotating relation with flange 43 whereby fluid passing through the grooves will not leak. If desired and where high pressures are used suitable sealing rings may be provided to prevent leakage of liquid and fluid. It is evident that one groove in each pair 45, 51 and 44, 47 may be omitted to reduce manufacturing costs as the structure is operative with a single groove in communication with a communicating passageway.

To prevent rotation of plate 50 and ring 46, means in the form of an elongated brace 55 secured to plate 50 is extended to a relatively fixed part of the chassis and secured thereto by a strap member 56 secured by a bolt 56' or the like. Other means such as a suspended eccentric weight, connection between levers, or a fork secured to the plate 50 and embracing a projection on the chassis may be used to prevent the rotation of the plate member and the ring. Also if the axle is fixed, the plate 50 may be non-rotatably connected to such fixed axle to prevent rotation of plate 50 and ring 46.

Assuming that inner tube 31 is filled with a liquid to be dispensed through nozzle 61, such liquid passes through valve stem 33, conduit 41, passage 39, groove 44, and groove 47, passage 48, and conduit 49 to valve 57 which is open permitting liquid to pass through a conduit 58, a hose 59, valve 60, and nozzle 61 thereby providing an unobstructed passage for the liquid being dispensed. The spray may be controlled by means of the valve 60.

For supplying a source of fluid pressure to the inner tube 30 a source of power such as an internal combustion engine 62 or a conventional power take-off shaft on the vehicle provided with a pulley 62' is connected by a belt 63 to a driven wheel 63' of a fluid pump 64 which may be a gas or liquid pump or a pump capable of pumping gases or liquids and/or produce a vacuum. An inlet pipe 65 carries air or other fluid to the fluid pump or compressor 64 and the fluid under pressure is delivered to pipe 66 from which a branch 67 carries a pressure relief valve 68 serving as a by-pass in the event of excessive pressure in pipe 66 or 67. Another branch 69 provided with a valve 70 is connected to conduit 49 by conduit 71. The valve 70 is closed when fluid from inner tube 31 is dispensed through nozzle 61. An extension of pipe 66 is provided with valve 72 which is open at this time and a conduit 73 therefrom provides communication with conduit 53. A valve 74 on the extension of conduit 53, closed in the present situation, is connected to conduit 58 by means of conduit 75. The fluid pressure from fluid pump 64 is conducted to inner tube 30 through pipe 66, open valve 72, conduits 73 and 53, passage 52, grooves 51 and 45, passage 40, conduit 42, and valve stem 32 to the interior of inner tube 30.

To make sure that all of the fluid is removed from an inner tube it is within the invention to provide a vacuum on such inner tube to remove all of the fluid therefrom. This may be accomplished by suitable connections to a vacuum type pump and may be obtained from the pump 64 by suitable conduits and valves. However, normally the fluid is sufficiently removed for practical purposes without applying a vacuum.

With the arrangement shown it will be apparent that the liquid in inner tube 31 may be forced through nozzle 61 when fluid pump 64 is operated to force fluid into inner tube 30 and the pressure in the system may be kept constant since relief valve 68 will permit excessive pressure to be relieved thereby preventing the tire casing from bursting. It will be apparent that other means such as a pressure reducing valve or a control for the motor or a clutch responsive to the pressure may be used to maintain the proper pressure. The liquid will be dispensed until the inner tube is empty or until the valve 61 is closed or the fluid pump 64 is stopped. The vehicle may be supported by the tire during the entire operation and the load of the liquid in the inner tube 31 is carried directly on the ground and consequently the design of the vehicle does not have to include the weight of the load of liquid in the inner tube since such load is not supported by the wheel bearings or by the springs if the vehicle is provided with springs. Further, the tire already carried by the vehicle serves as the storage tank thereby reducing the expense of separate tanks on the vehicle for carrying the liquid such as an insecticide. This is particularly advantageous on farm vehicles where the vehicle such as a tractor may be used for towing a load, cultivating and simultaneously used for spraying an insecticide. By closing valves 72 and 57 and opening valves 74 and 70, inner tube 30 may be used for containing the liquid or fluid to be dispensed. Pump 64 may be used to fill either inner tube with a fluid by connecting inlet pipe 65 thereof to the source of supply of the liquid or fluid and therefore the system may have very diverse uses.

In Figures 4 and 5 another form of the invention includes a casing 76 which may be of flexible tubular material closed at one end and into which a fluid tight bladder 77 having two chambers 78 and 79 separated by wall 77' is inserted. Chamber 78 may have two nipples 80 and 81 projecting through apertures in the casing 76 and providing communication between the chamber 78 and the exterior of the casing. Similar nipples 82 and 83 may be provided for the other chamber 79 for communication between the chamber 79 and the exterior of the casing. The open end of the casing may be folded several times as shown at 84 and bars 85 and 86 placed on opposite sides and secured together by bolts 87 for maintaining the folds in confining position for taking the expansive force of the bladder 77. One chamber may be filled with the liquid to be dispensed and the other chamber may have fluid pressure applied for the purpose of forcing the fluid from the first chamber. The provision of two nipples to each chamber allows complete cleaning by the continuous flow of a liquid or fluid through the chamber as the liquid may flow in through one nipple and out through the other. Also it is possible for one chamber to be filled with a material which may normally be solid but which becomes fluid when heated. To dispense such fluidizable material a heated medium such as hot gas, steam, or hot water may be forced into one nipple of the other chamber and a part of such steam, hot gas, or hot water may escape through the other nipple thereby heating the normally solid material in the first chamber a sufficient amount so that such normally solid material may be expelled and the pressure of the gas, steam, water or the like serving to supply the necessary expelling pressure. Obviously automatic controls may be used to maintain proper operating conditions of temperature and pressure. It is contemplated that the bladder 77 may be made of sufficient strength by cords being embedded therein or by the use of suitable material to resist bursting making the casing 76 unnecessary. It is obvious that the bladder will be made of material which does not react with the fluids and which is not adversely affected by such fluids contained therein.

Figure 6 illustrates a modification which includes a casing 88 having a cover 89 secured to the ends and sides of the casing by hinge members 90 and 91 connected by removable pintle pins 92. Open ended bladders 93 and 94 positioned in the casing are closed at their ends by suitable means such as bars 95 similar to bars 85 and 86 and fastening means such as bolts or clamps for maintaining the folded over ends of the bladders in fluid tight condition. The bladders may have one or more nipples 96, 97 through which fluids or liquids may flow. The nipples may be connected by any suitable conduits to sources of pressure or supply and/or discharge conduits as desired.

In Figure 7 a portion of a base is shown at 98 upon which an open bottom cage 99 is fixed by bolts 100 passing through lugs 101 fixed to the cage and threadedly secured in the base 98. Within the cage 99 a pair of bladders 102 and 103 have conduits 104 and 105 respectively communicating with the bladders for the admission and withdrawal of fluid. This structure is suitable for the purposes of the other modifications and is particularly suitable for a displacement unit for hydraulic brakes on a spring supported wheeled vehicle between the wheel cylinder brake expanding mechanism and the frame of the vehicle. One conduit such as 104 will be in communication with the master cylinder operated by the usual foot pedal and the other conduit 105 will be in communication with the brake wheel cylinder. The conduit 105 is normally flexible to compensate for the flexure of the conventional springs of a vehicle. The capacity of the bladder 103 is sufficient so that the liquid displacement thereof is at least equal to the maximum displacement of the wheel brake cylinder. One of the advantages of the present construction is that in the event of failure of the conduit 105 or leakage of the brake cylinder only a limited amount of hydraulic fluid will be lost and the other brakes can still operate. In present hydraulic brakes the entire supply of hydraulic fluid may be lost from any leak anywhere in the system. If desired a second conduit or outlet may be provided for each bladder for the purpose of bleeding the system to eliminate air pockets.

The use of two bladders in a single confining cage also makes it possible for a source of fluid pressure such as the oil pressure system of a lubricating system of an internal combustion engine to provide the pressure in one bladder and the resulting pressure in the second bladder may be used for power steering, power brakes, clutch control or other power operation under fluid pressure without requiring the engine lubricant to be directly used. Consequently there is no danger of loss of lubricant in the event of fluid loss in the second bladder or the mechanism operated thereby. This structure avoids the duplication of fluid pressure pumps and the like for furnishing the pressure thereby reducing the cost and making the advantages of power operation available in low priced vehicles. This construction makes it possible to use the same fluid in both bladders or fluids of different characteristics such as different viscosities or different boiling points or freezing points. Further, it is possible to have more than two bladders in a single cage and one source of fluid pressure may produce a corresponding fluid pressure in more than one other bladder for purposes of dispensing different liquids or fluids at substantially the same pressure. Thus the structure may be used by decorators for forcing fluid substances such as confections in fluid states for decorating various confections or cakes. Also the atmosphere is prevented from contacting the fluid being dispensed and oxidation or evaporation thereof is avoided before the dispensed fluid is discharged. This is especially advantageous with paints having a volatile solvent or having an oxidizable material therein.

A source of steam such as a boiler 106 (Fig. 9) carries steam through a conduit 107 to a first bladder 108 and the steam or condensate may pass out through another conduit 109 and the pressure therein may be controlled by an adjustable relief valve 110 or condensate trap. A second bladder 111 may contain a fluid to be dispensed and may be provided with conduits 112 and 113 provided with valves 114 and 115 respectively for controlling the filling and dispensing of the fluid from the bladder 111. The bladders 108 and 111 are confined within cage 115A shown in section. The provision of two conduits for each bladder simplifies cleaning the bladder as cleaning fluid may be forced therethrough.

A source of fluid pressure 116 (Figure 10) may supply fluid by means of conduit 117 to chamber 118 of flexible substantially non-stretchable container 120. The other chamber 119 of the container 120 serves to receive and dispense a fluid. The container 120 is made of flexible material which cannot appreciably stretch under pressure. A wall 121 of flexible impervious material serves to separate chamber 117 from 118 and is approximately equal to half of the area of the container 120 and is secured to the wall of the container by a fluid tight connection such as vulcanization. Such a container may be made of rubber or other impervious rubber-like material and may be reinforced with fabric which may be imbedded in the rubber-like material of the container or a cage of netting may be used around the exterior of the container to take the bursting strain thereby making it unnecessary to reinforce the container. Such container may be spherical, cylindrical, or cylindrical with semi-spherical ends so that the strains will all be in tension. Consequently such a container may be made to occupy a minimum of space when empty and may be filled to capacity without requiring any appreciable external support. A nipple or conduit 122 provides communication between the interior of the chamber 119 and the outside of the container and permits dispensing of liquid or other fluid.

A form of the invention may include three plies of fluid impervious material 123, 124 and 125 (Figs. 11 and 12) which are joined at their longitudinal edges as shown to provide two chambers 126 and 127 having nipples 128 and 129 respectively providing communication between the chambers and the exterior. The ends of the chambers may be open for facilitating filling thereof as well as cleaning and such ends are closed by folding over the three plies and applying bars 130 to opposite sides of the folds and holding the bars in clamping relation by means of bolts 131 passing through the ends of the clamping bars 130 and secured by nuts 132. The plies of material 123 and 125 are of sufficient strength and limited stretchability for sustaining the pressure required for dispensing the fluid material and the ply 126 provides the means for separating the two chambers 126 and 127. It will be apparent that two or more nipples may be provided for each chamber if desired to have fluid passing therethrough such as for heating the substance being dispensed.

A conventional pastry bag 133 (Fig. 13) provided with a nozzle 134 and containing a fluid decorating material 135 also contains a bladder 136 provided with a nipple 137 through which a pressure fluid may be conducted into the bladder in a similar manner to that disclosed above. The top of the pastry bag may be closed by bringing the edge of the open end of the bag together around the nipple of the bladder and securing the bag closed by means of a cord or the like 138. When it is desired to dispense the decorating material from the pastry bag fluid pressure is applied to the nipple and fills the bladder thereby exerting pressure on the decorating material and dispensing such material in a controlled fashion. If desired a valve may be provided on the nozzle whereby the operator may accurately control the flow of the material at the point of delivery.

A modified means providing communication between a relatively stationary part of a vehicle and the interior of several inner tubes or chambers in the tire is shown in Figure 14. A portion of a wheel is shown with a hub 139 having a disk or spokes 140 which support the usual rim and tire similar to hub and wheel 27A and 27 respectively of Figures 2 and 3, but the hub 139 is freely rotatable on a stationary spindle 141 which may be the axle of a trailer or the like. A recessed plate 142 is provided with an inwardly projecting lug 143 extending into the usual keyway 144 for lock washers in spindle 141 thereby preventing rotative movement of plate 142 relative to the spindle.

A manifold 145 having a flange 146 is mounted for rotation in plate 142 and is held therein by ring 147 which is secured to plate 142 by a plurality of bolts 148 or the like (only one bolt being shown for simplicity). The plate 142 is provided with an annular groove 149 and a passage 150 communicating with a conduit 151 which may be connected to a dispensing nozzle or the like similar to the one shown in Figure 2. Manifold 145 is provided with a passage 152 in communication with annular groove 149 and with tube 153 connected to one chamber in the tire from which fluid is to be dispensed.

Ring 147 is provided with an annular groove 154 in communication with passage 155 connected to tube 156 which may be connected to the source of fluid pressure. Manifold 146 is provided with a passage 157 providing communication between groove 154 and a tube 158 which is connected to another chamber in the tire for receiving the fluid pressure. Fixed to manifold 146 is one or more L-shaped rods 159 which engage with the disk or spokes 140 of the wheel and cause manifold 146 to rotate with the wheel and the plate 142 and ring 147 are held stationary with respect to the spindle by the projecting lug 143 in keyway 144 and therefore tubes 151 and 156 can communicate with the dispensing apparatus and the source of fluid pressure respectively. The swivel unit is held on the spindle by the usual nut 160 and lock washer 160A which has the usual inwardly extending lug and a spacing element 161 which may have an inwardly extending lug to prevent rotation. Said spacing element 161 serves to properly locate plate 142 relative to the usual ball or roller bearing raceway 162 within the hub. Therefore the swivel of this modification may be mounted on a vehicle with a minimum of effort and without any material change in the vehicle. In some cases it may be necessary to provide an elongated spindle to obtain the desired clearance or the central opening of the plate and manifold may be enlarged in the swivel.

The invention is adaptable for use with tires without tubes where the fluid tight tire casing is sealed to the rim and a valve stem is provided in the rim. A conventional inner tube is first mounted in such a tire and a second valve stem receiving opening provided in the rim for the inner tube valve stem with suitable sealing means such as washers secured to the valve stem of the inner tube and fluid tightly engaging the rim by the use of nuts threaded on the exterior threads of one form of the conventional valve stem of the inner tube. Other sealing means may be used if desired. The space between the exterior of the inner tube and inside of the tire casing provides one chamber and the inner tube provides the other chamber. If desired more than one inner tube could be provided in such a tire thereby providing means to apply pressure to several chambers simultaneously.

The invention is adaptable for transporting material in a fluid tight container having collapsible walls and such a collapsible container may be placed in a relatively non-stretchable cage with a second flexible walled container so that the material in the collapsible container may be dispensed by applying pressure to the said second flexible walled container.

It will be apparent that the invention may be embodied in various forms within the spirit of the invention as defined in the claims.

What is claimed is:
1. The method of dispensing hydraulic fluid comprising confining two bladders in a bursting resisting cage, filling the first bladder with a hydraulic fluid to be dispensed while the other bladder is substantially empty, applying a continuous hydraulic pressure to the second bladder and thereby applying the same continuous pressure to said first bladder to cause dispensing of the fluid from said first bladder, controlling the discharge from said first bladder whereby the hydraulic fluid from said first bladder can be accurately and controllingly dispensed in accordance with requirements for the hydraulic fluid from said first bladder.

2. The method of dispensing fluid comprising confining first and second bladders within a bursting resisting cage, placing fluid to be dispensed in said first bladder, applying constant continuous uniform fluid pressure to the interior of said second bladder regardless of the variation in size or shape of said bladders, and thereby applying the same continuous constant pressure to said first bladder to cause dispensing of the fluid from said first bladder, and controlling the discharge of fluid from said first bladder whereby the fluid to be dispensed will be delivered at the same constant continuous pressure as the fluid pressure applied to said second bladder.

3. The invention according to claim 2, further comprising confining at least one other bladder within said bursting resisting cage, whereby the fluid pressure in the second bladder also causes continuous constant pressure on said other bladder to cause dispensing of the fluid from said other bladder, and controlling the dispensing of the fluid from said other bladder.

4. Apparatus for dispensing fluid comprising a bursting resisting cage, first and second fluid-tight bladders in said cage, said first bladder being of a construction to retain a fluid without damage thereto and from which the fluid may be dispensed while said second bladder is substantially empty; nipple means on said second bladder for applying continuous pressure to said second bladder and thereby apply the same continuous pressure to said first bladder, nipple means on said first bladder substantially diametrically opposed to said nipple means on said second bladder for controlling the dispensing of fluid from said first bladder whereby the fluid from said first bladder can be controllingly dispensed at the same pressure as the pressure provided by said means to apply a continuous pressure in accordance with the requirements for the fluid from said first bladder.

5. The invention according to claim 4 in which a source of continuous pressure is applied to the nipple means on said second bladder, and said source of continuous pressure includes a pressure relief valve.

6. The invention according to claim 4 in which the cage is a tire casing and rim and the bladders are inner tubes.

7. The invention according to claim 4 in which said second bladder is provided with additional nipple means whereby the apparatus may be kept at a suitable temperature for effective discharge of the fluid from said first bladder.

8. The invention according to claim 4 in which a valve is provided in the nipple means on said first bladder, means for automatically opening said valve when a dispensing tube is secured to said nipple means on said first bladder, and said means automatically closing said valve when the dispensing tube is removed from said nipple means on said first bladder thereby preventing undesired loss of fluid from said first bladder.

9. The method of dispensing hydraulic fluid comprising confining two bladders in a bursting resisting cage, filling the first bladder with a first hydraulic fluid to be dispensed while the second bladder is substantially empty, introducing a second hydraulic fluid at a relatively high pressure into one end of said second bladder at a predetermined temperature, discharging said second hydraulic fluid at the opposite end of said second bladder at a relatively low constant uniform pressure to cause a circulation of said second hydraulic fluid through said second bladder to maintain a selected temperature and pressure in said first bladder and said first hydraulic fluid therein, controlling the discharge from said first bladder whereby said first hydraulic fluid from said first bladder can be accurately and controllingly dispensed.

10. The method of dispensing fluid from a first bladder comprising confining two bladders within a bursting resisting cage, placing a first fluid to be dispensed in said first bladder, introducing a second fluid at a relatively high pressure into one end of said second bladder at a predetermined temperature, discharging said second fluid at an opposite end of said second bladder at a relatively low constant uniform pressure to cause circulation of the said second fluid through the second bladder to maintain a selected temperature and pressure in said first bladder and said first fluid therein, controlling the discharge from said first bladder whereby said first fluid from said first bladder can be accurately and controllingly dispensed.

11. A vehicle having a hollow supporting tire thereon, said tire being provided with two separate fluid tight chambers having flexible wall means separating said chambers, said tire being rotatively mounted, a swivel on said rotatable mounting for said tire including a rotatable means and a stationary means each having cooperating sections of respectively communicating passages, one of said passages providing communication with one of said chambers and another of said passages providing communication with the other of said chambers whereby one chamber may be filled with one fluid and the other chamber may thereafter be filled with the same or a different fluid and force the fluid out of the said first chamber while the tire is in motion or while the tire is stationary.

12. A dispensing structure comprising a support, a pressure confining cage, means to mount said cage for rotation about an axis on said support, said cage being provided with two separate chambers having flexible wall means separating said chambers, a swivel on the rotatable mounting of said cage including a rotatable means and a stationary means each having cooperating sections of respectively communicating passages providing communication with one of said chambers, and another of said passages providing communication with the other of said chambers whereby one chamber may be filled with one fluid and the other chamber may be filled with the same or a different fluid and force fluid out of said first chamber while the cage is in motion or while the cage is stationary.

References Cited in the file of this patent

UNITED STATES PATENTS

| | | |
|---|---|---|
| 2,097,985 | Maryott | Nov. 2, 1937 |
| 2,120,412 | Kucki | June 14, 1938 |
| 2,282,598 | Austria | May 12, 1942 |
| 2,307,429 | Steidinger | Jan. 5, 1943 |
| 2,326,037 | Jung | Aug. 3, 1943 |
| 2,491,491 | Freygang | Dec. 20, 1949 |
| 2,557,498 | Collender | June 19, 1951 |
| 2,672,908 | Donegan | Mar. 23, 1954 |

FOREIGN PATENTS

| | | |
|---|---|---|
| 680,108 | Great Britain | Oct. 1, 1952 |